United States Patent
Kuehn et al.

(10) Patent No.: US 6,554,740 B2
(45) Date of Patent: Apr. 29, 2003

(54) CONTROL SYSTEM FOR A VEHICLE HAVING A TRANSMISSION CONTROL

(75) Inventors: Willi Kuehn, Markgroeningen (DE); Karl-Heinz Senger, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/750,885

(22) Filed: Dec. 28, 2000

(65) Prior Publication Data

US 2001/0006924 A1 Jul. 5, 2001

(30) Foreign Application Priority Data

Dec. 30, 1999 (DE) .......................... 199 63 782

(51) Int. Cl.⁷ .............................................. B60K 41/04
(52) U.S. Cl. ...................................... 477/115; 477/107
(58) Field of Search .................................. 477/115, 107

(56) References Cited

U.S. PATENT DOCUMENTS

| | | | |
|---|---|---|---|
| 4,935,872 A | * | 6/1990 | Benford et al. .............. 477/115 |
| 5,050,456 A | * | 9/1991 | Fukuda ........................ 477/115 |
| 5,487,004 A | * | 1/1996 | Amsallen .................... 192/3.58 |
| 5,514,050 A | * | 5/1996 | Bauerle et al. .............. 477/118 |
| 5,587,905 A | * | 12/1996 | Yesel et al. .................. 477/115 |
| 5,676,620 A | * | 10/1997 | Ulm et al. .................... 477/115 |
| 5,704,873 A | * | 1/1998 | Iwata et al. .................. 477/115 |
| 5,706,197 A | * | 1/1998 | Stasik et al. ........... 364/424.081 |
| 5,839,083 A | * | 11/1998 | Sugiyama .................... 477/115 |
| 6,014,604 A | * | 1/2000 | Kuroiwa et al. ............. 477/115 |

FOREIGN PATENT DOCUMENTS

| | | | | |
|---|---|---|---|---|
| DE | 44 41 896 | | 5/1996 | |
| JP | 408036506 A | * | 2/1996 | ........... G06F/11/22 |

* cited by examiner

*Primary Examiner*—Christopher P. Schwartz
*Assistant Examiner*—Xuan Lan Nguyen
(74) *Attorney, Agent, or Firm*—Kenyon & Kenyon

(57) ABSTRACT

To significantly reduce the use of single signal lines using a simplest possible contacting and connecting technique, a control system is described, in which the electrical shifting elements located in the passenger compartment are connected via signal lines to an electronic control unit, which is located in the passenger compartment and linked to the data bus, and which combines the signals transmitted over the signal lines and routes them via the data bus to the transmission control. The outlay for the wiring harness is again greatly reduced, with the data bus now also being routed into the passenger compartment, enabling additional devices to be connected thereto. Accordingly, the control system can be easily expanded.

6 Claims, 1 Drawing Sheet

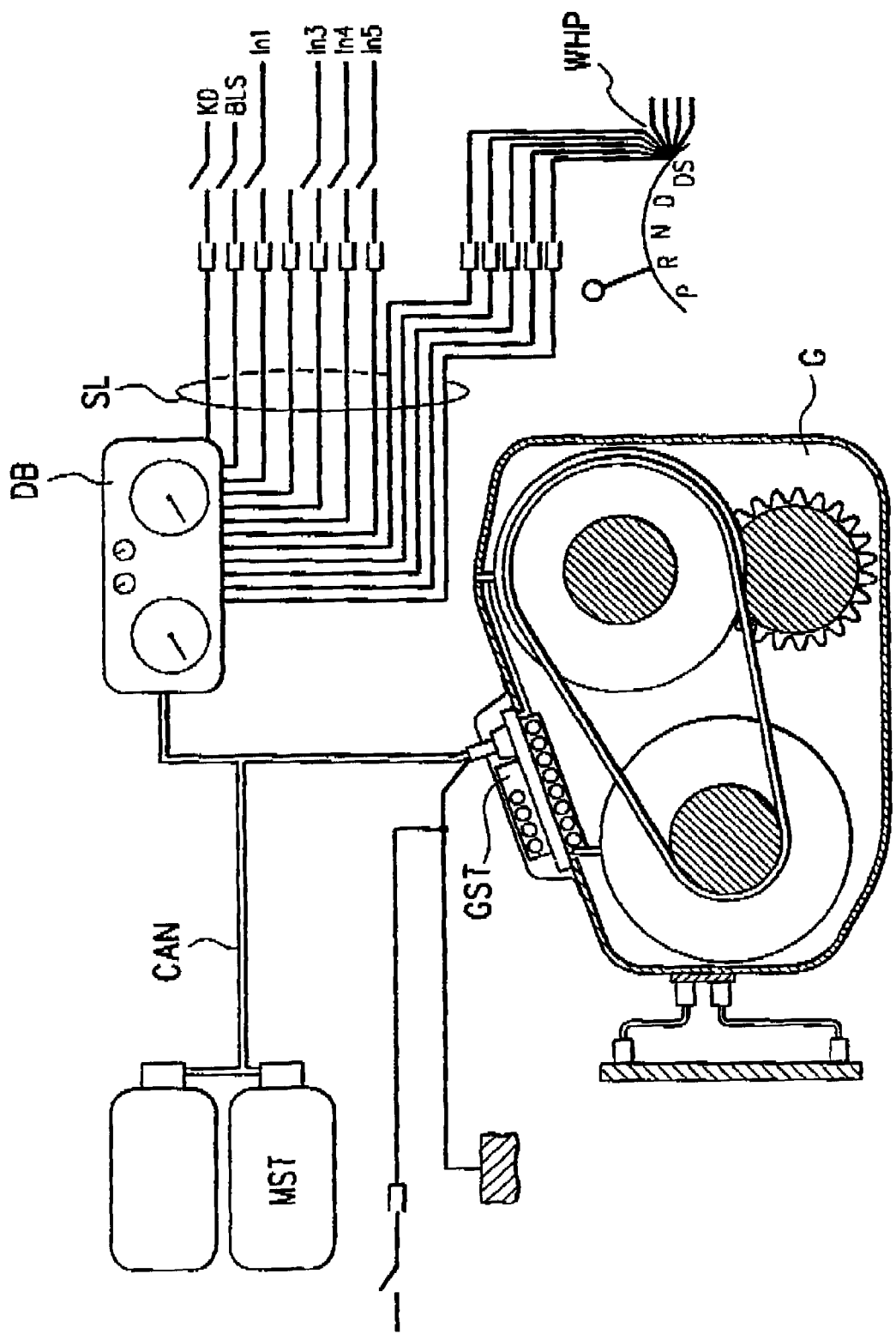

CONTROL SYSTEM FOR A VEHICLE HAVING A TRANSMISSION CONTROL

BACKGROUND INFORMATION

Control systems for vehicle engines and transmissions, in particular of motor vehicles having an automated transmission, are being continually further developed and improved upon. In the process, the following functions are attributed for the most part to the modern transmission control:

shift control for a smooth and wear-free gear shifting;

control of the (torque) converter lockup clutch;

shift logic, which determines the gear to be engaged;

self-diagnostics; and basic functions, such as input and output functions.

German Patent Application No. DE 44 41 896 describes a control system having a transmission control designated therein as "smart ratio change unit", which is mounted on the transmission of the vehicle in order to directly control the hydraulic valves (actuators) there. Moreover, an engine management is provided, which is connected to the transmission control via a communications channel configured as a CAN data bus to exchange data with the transmission control. The extent to which signal lines are used, i.e., the outlay for the vehicle's wiring harness, is reduced by mounting the transmission control directly on the transmission housing and by using a data bus. Arranged moreover in the passenger compartment is a plurality of electrical shifting components, such as a selector lever switch, a kickdown switch, or a driving program selector (shift mode button), which transmit different switch point and sensor signals to the transmission control via numerous single lines.

SUMMARY OF THE INVENTION

An object of the present invention is to improve the aforementioned control system in a way that will again significantly reduce the use of single signal lines using a simplest possible contacting and connecting technique. A vehicle equipped with such a control system is also described.

Therefore, the electrical shifting components located in the passenger compartment are connected via signal lines to an electronic control unit, which is located in the passenger compartment and connected to the data bus, and which combines the signals transmitted over the signal lines, routing them via the data bus to the transmission control.

This means that the numerous signal lines do not need to be laid directly to the transmission control, but merely to the electronic control unit, which is likewise located in the passenger compartment and assumes the function of a series-connected, processor-controlled line concentrator that is linked to the transmission control via the data bus. The outlay for the wiring harness is again clearly diminished, with the data bus now also being routed into the passenger compartment, enabling additional devices to be connected thereto. Accordingly, the control system can be easily expanded.

It is particularly advantageous for the electronic control unit to be a microprocessor-controlled instrument cluster, located on the dashboard or in the passenger compartment of the vehicle. This enables an already existing instrument cluster to be used for the concentrator function in that it is merely expanded by a processor-controlled bus port having plug-in connections, as well as input and output functions. The result is an especially cost-effective realization of the present invention.

In addition, in the event that the transmission is an automatic multiple-ratio transmission or a continuously variable transmission, it is particularly advantageous for electrohydraulic modules that shift the transmission to be integrated in the transmission control. This achieves a high level of integration of electrical and hydraulic components and keeps the amount of cabling at the transmission housing to a minimum. In this context, a special, additional advantage is derived when the transmission control and the engine management are combined into one central control system located in the engine compartment of the vehicle.

Another special advantage is derived when a (communication) security line is installed in the vehicle in parallel to the data bus for additionally transmitting the signals to be transmitted using a modulation process, particularly a pulse-width modulation process. This enables the control system to remain fully intact in the event of a transmission disturbance on the data bus. In this context, the modulation process, which is preferably a pulse-width modulation process, renders possible a fail-safe transmission of a multiplicity of signals over this one security line.

BRIEF DESCRIPTION OF THE DRAWINGS

The FIGURE shows a control system according to the present invention.

DETAILED DESCRIPTION

The FIGURE shows a control system in accordance with the present invention for a vehicle having a transmission control GST, which is located on the transmission G of the vehicle. In this example, the transmission is an automatic multiple-ratio transmission; however, it can also be a different transmission, in particular a so-called CVT transmission having a steel thrust belt. An engine management MST is also provided which is connected via a data bus CAN to the transmission control GST. The intention is for a plurality of electrical shifting elements, such as a kickdown switch KD, a brake lights switch BLS, or a selector lever position switch WHP, which are located in the passenger compartment, to exchange signals with the transmission control. The same also applies to other shifting elements, such as a manual mode switch IN1, an upshift signal transmitter IN3, or a downshift signal transmitter IN4, as well as an economy sport switch IN5.

The correspondingly numerous signals are initially transmitted along single signal lines SL. According to the present invention, the signal lines are, however, not run to the transmission control GST, but to an electronic control unit DB, which is located in the passenger compartment and connected to the data bus CAN, and which combines the signals transmitted over the signal lines SL, and then routes the signals over the data bus CAN to the transmission control GST. A considerable cabling expenditure is thereby avoided. This eliminates the need for expanding the already highly complex wiring harness in vehicles by adding numerous single lines. Thus, the cost of materials is reduced, and the operational reliability is enhanced.

The electronic control unit is an instrument cluster DB, which is integrated in the vehicle's dashboard. In this example, an instrument cluster known from the compact class is used, which has been expanded by a bus port. To combine the numerous switch point signals into one digital data bus signal, the electronics, in particular the microprocessor, already existing in the instrument cluster, which essentially perform a multiplex function, are used to the greatest extent possible. Combining the signals not only has the advantage that the number of lines is greatly reduced, but also that the plug-in connectors provided on the transmission control GST can be easily assembled because the number of pins per connector is significantly reduced. Thus, essentially only simple plug-in connectors and input and output units (I/O circuits) are needed, whereas expensive, media- and shakeproof contacts would have had to be used on the transmission. Moreover, the connecting technique is also simplified in the electronic control unit located in the transmission, since conventional stamping grids can be used in place of expensive precision stamping grids. Merely the data bus CAN needs to be run from the passenger compartment of the vehicle through the bulkhead into the engine compartment.

Preferably, an analog security line (not illustrated here), via which the signals are transmitted in parallel to the data bus signal, can be provided in addition to the digital data bus CAN. A pulse-width modulation process or the like can be used for the purpose of transmitting the numerous signals in an interference-resistant manner to the transmission control GST. In the event of interference on the data bus CAN, the security line fulfills a fallback (standby) function, ensuring vehicle operation at all times.

Furthermore, the engine management and the transmission control can be integrated in one device located in the vehicle's engine compartment. Moreover, by integrating the bus system in accordance with the present invention in the transmission control, additional signals having information variables, such as the driver-seat memory function (seat memory), can be taken into account. For example, when a code stored in the driver's seat memory is entered, a correction value (offset) is applied to the adaptive driving program corresponding to that driver's last setting. The vehicle immediately responds by providing the desired handling properties (performance characteristics) without having to adapt to a lengthy training period, even in the event of a driver change. This and other synergetic effects are achieved by coupling the transmission control to the data bus system in accordance with the present invention. In this context, it is also necessary to mention the advantage that, in the event of a fault in the transmission control GST, information, alarm signals in particular, can be routed via the bus system to the instrument cluster (DB). Independently thereof, the data bus connection CAN also makes it possible to use an electronic selector lever, which is preferably integrated in the turn signal lever on the vehicle's dashboard.

The present invention was described on the basis of an especially advantageous embodiment. However, it is not limited to this one specific embodiment. Numerous other embodiments, such as the use of an optical data bus system, are also conceivable.

What is claimed is:

1. A control system for a vehicle having a transmission control mounted on a transmission of the vehicle, comprising:

a data bus;

an engine management coupled to the transmission control via the data bus;

signal lines;

a plurality of electrical shifting components situated in a passenger compartment of the vehicle; and an electronic control unit coupled to the shifting components via the signal lines, the electronic control unit being situated in the passenger compartment, the electronic control unit combining signals transmitted over the signal lines and routing the signals via the data bus to the transmission control.

2. The control system according to claim 1, wherein the control unit includes a microprocessor-controlled instrument cluster situated on a dashboard of the vehicle.

3. The control system according to claim 1, wherein the transmission is one of an automatic multiple-ratio transmission and a continuously variable transmission, and wherein electrohydraulic modules, which shift the automatic multiple-ratio transmission, are integrated in the transmission control.

4. The control system according to claim 1, wherein the transmission control and the engine management are combined into one central control system situated in an engine compartment of the vehicle.

5. The control system according to claim 1, further comprising a security line situated in the vehicle in parallel to the data bus for additionally transmitting the signals to be transmitted using a pulse-width modulation process.

6. The control system according to claim 1, wherein the control system is situated in a motor vehicle having an automatic transmission.

* * * * *